Sept. 3, 1957  D. C. DYE  2,805,371
CAPACITANCE SENSING ELEMENT
Filed Oct. 24, 1955
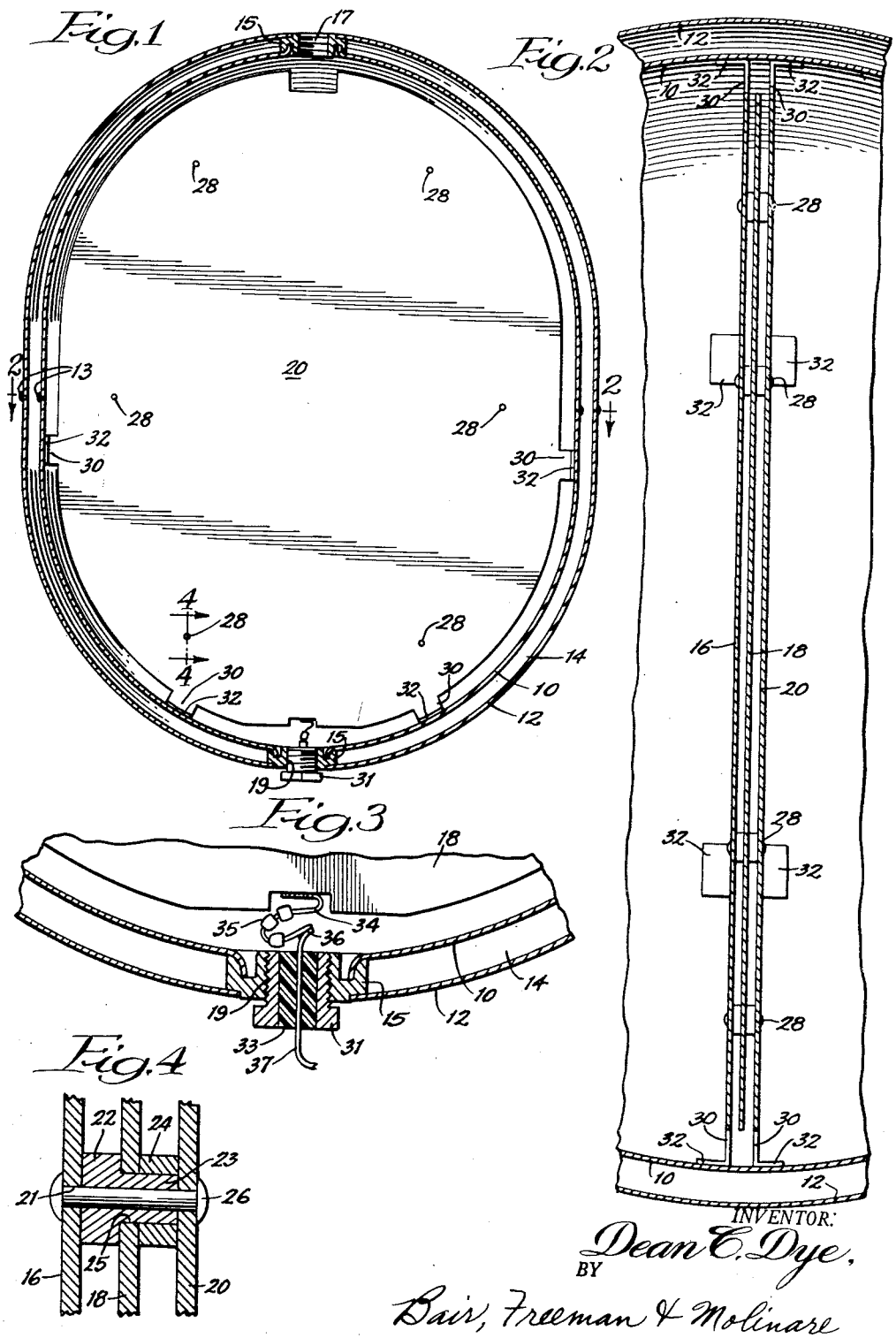
INVENTOR:
Dean C. Dye,
BY
Bair, Freeman & Molinare
ATTORNEYS.

United States Patent Office 2,805,371
Patented Sept. 3, 1957

2,805,371

CAPACITANCE SENSING ELEMENT

Dean C. Dye, Covina, Calif., assignor to The Aro Equipment Corporation, Bryan, Ohio, a corporation of Ohio Application October 24, 1955, Serial No. 542,237

2 Claims. (Cl. 317—246)

This invention relates to liquid level indicators, and more particularly to an electronic oscillator-type apparatus having a capacitance sensing element of novel construction for indicating variations in the liquid level in a container. In measuring the levels of various liquids, such as liquefied gases or other liquids which must be maintained under high pressure or low temperature conditions or which must securely enclose a gas of noxious or corrosive properties, it is not feasible to use mechanical floats, manometers or the like because of the condition of sealing the moving parts without introducing excessive friction. In the case of liquefied gases or other low temperature liquids, maintenance of the mechanical parts in a condition free to move at the lower temperatures introduces a further difficulty. Since most of the liquids in this class are non-conductive or have extremely poor electrical conductivity, it is not feasible to use spaced contacts progressively to complete circuits through the liquid to indicate level.

It is one object of the present invention to provide a capacitance sensing element adapted to be mounted within a liquid container of the type described which will function to indicate accurately slight changes in capacitance under varying conditions of temperature and pressure.

It is another object to provide a capacitance sensing element which conforms in cross-sectional shape to the liquid container in which it is mounted to provide accurate volume readings despite non-linearity in the cross-sectional shape of the container.

According to a principal feature of this invention, the sensing element consists of three spaced parallel plates rigidly secured to each other in insulating relation. In contrast to conventional two-plate capacitors, should the plates of my capacitor become distorted due to changes in temperature or pressure, the accuracy is not affected since a decrease in the distance between the center plate and one of the outside plates is automatically compensated for by an increase in the distance between the center plate and the other outside plate. In other words, the use of three plates decreases the accuracy required in maintaining the space dimensions between plates.

These and other objects and advantages of my invention will become apparent from the following description when read in conjunction with the accompanying drawing, in which:

Figure 1 is a vertical sectional view through a container having a sensing element constructed in accordance with the invention;

Figure 2 is an enlarged horizontal sectional view taken along the line 2—2 of Figure 1;

Figure 3 is an enlarged detailed section through the lower wall of the container illustrating the device for making the connection from the sensing element to the oscillator circuit outside the container; and Figure 4 is a sectional view taken along the line 4—4 of Figure 1 enlarged to show the means for securing the several plates together.

The drawing illustrates a preferred form of the invention comprising a container 10 ellipsoidal in shape having an outer shell 12 to provide an insulating evacuated space 14 therebetween for thermally insulating the contents of the container from the atmosphere. Preferably, the container is made from two halves which are joined together by means of an equatorial weld, indicated by the numeral 13. The container, of course, need not be of this particular construction since the sensing element of the invention is suitable for use in any type of liquid container. The container illustrated is preferably used for liquid oxygen and may be made from stainless steel.

To provide access to the interior of the container, fittings 15 are sealed in the upper and lower ends of the container and contain tapped openings 17 and 19 for making necessary connections to the interior of the container. The lower opening 19 is used in the construction illustrated for making an electrical connection from the capacitance sensing element to the recording instrument outside the container, as described hereinbelow.

The capacitance sensing element consists of three parallel spaced congruent plates 16, 18 and 20 secured together in insulating relation. The plates are made of electrically conductive material. Each has the same contour which preferably conforms exactly to the contour of the container in which the sensing element is mounted. The contour may be different if desired, so long as the area of the plates below any liquid level is proportional to the container volume below that level. The periphery of the plates is shorter than the peripheral distance around the inside of the container so that the plates are spaced from the inner container wall. The central plate 18 is insulated from the outer plates 16 and 20 by dielectric spacer elements 22 and 24. The element 22 is T-shaped in cross section and consists of a tubular member 23 containing an axial bore 21. The enlarged head of the element 22 is of suitable thickness to space the plate 16 from the plate 18 at an appropriate distance. The tubular portion 23 is adapted to slide into an opening 25 through the plate 18. Separator ring 24, also made from dielectric material, slides over the end of the tubular member 23 and serves to space the outer plate 20 from central plate 18. The ring 24 terminates in the same plane with the end of the tube 23. An elongated fastening member, such as a rivet 26, is disposed within the bore 21 and serves to secure all three plates in spaced insulating relation. A sufficient number of these, or other suitable insulating connectors, are employed to maintain the plates in accurate parallelism. In the construction shown in the drawing, six such connector assemblies are employed, indicated generally by the numeral 28 in Figure 1.

The outer plates 16 and 20 carry a plurality of projections or tabs extending from the periphery thereof below the transverse center line. These projections may be L-shaped, as indicated by the numeral 30, having feet 32 which serve to connect the plates to, and space them from, the inner wall of the container. The feet are preferably welded to the container wall. During construction, the assembled plates are disposed within one of the halves comprising the container 10 and are welded in position before the other half is assembled to said first half to completely enclose the space within the container, including the sensing element.

Thus, the projections 30 are provided only on the bottom half of the sensing elements. In addition to securing the sensing elements to the interior of the container, the tabs or projections 30 also electrically ground outer plates 16 and 20.

To connect the central plate 18 to the recording portion of the indicating device, I have provided the construction shown best in Figure 3 consisting of a plug 31 containing a conductor 37 molded within the plug by means of a dielectric material 33. The plug is adapted to screw within the tapped opening 19 in the fitting 15 in the bottom of the container. The inner end of the conductor 37 is soldered to a conductor 34 at 36 which in turn is soldered to the central plate 18. The conductor 34 may be provided with glass beads 35 or other insulating material to prevent short-circuit. The soldered joint 36 is made just subsequent to the installation of the sensing element within the half of the container to which it is secured.

As pointed out in detail in my copending application, Serial No. 528,304, filed August 15, 1955, entitled "Liquid Level Indicator," the conductor leads to a fixed frequency oscillator circuit. A recording instrument is connected in parallel with a resonant circuit including the capacitance sensing element to the output of the oscillator. As the capacitance of the plates 16, 18 and 20 changes due to change in height of liquid within the container, the resonant circuit is turned to register on a D. C. indicating instrument, such as a voltmeter or milliammeter.

In addition to decreasing the accuracy required in maintaining the space dimensions between plates, the three plate element increases the fixed capacitance to a high capacitance-inductance ratio, thereby increasing the sensitivity of the device. Total fixed capacitance times the change in dielectric constant due to liquid level results in an increase in total capacitance. In most cases, the total capacitance changes by 40%. This can be seen by the formula $$C = .2240 \frac{KA}{d}(N-1)$$

In the above formula C is the capacitance in micro-microfarads (mmf.), .2240 is a constant for converting inches to centimeters, A is the area of the condenser plate in square inches, $d$ is the distance between the plates in inches, and N is the number of plates when more than two are used. K is the dielectric constant in which case most gases such as oxygen or nitrogen is equal to approximately 1.0. K of gases in the liquefied state is approximately 1.4. Assume a fixed capacitance of 100 mmf. when a container has only gaseous oxygen present. With all other factors in the formula remaining constant and K changing to 1.4 by the introduction of liquid oxygen, the total fixed capacitance then becomes 100 mmf.×1.4 or 140 mmf. The difference between 100 and 140 is the information used to vary the impedance circuit of the capacitance gauge.

From the foregoing it will be apparent that this invention provides a novel construction for a capacitance sensing element which is capable of indicating accurately the capacitance despite changes in temperature or pressure which would cause the plates to become distorted. Other modifications in the details of the invention will be apparent to those skilled in the art without departing from the true spirit and scope of my invention. It is, therefore, my intention not to limit the invention otherwise than as necessitated by the scope of the appended claims.

What I claim as new and desire to secure by Letters Patent of the United States is:

1. In a device for indicating the liquid level in a container in response to changes in capacitance, a capacitance sensing element comprising three spaced parallel conductive plates mounted within said container and having a plurality of projections extending from the periphery of the outer plates and secured to the inner wall of the container, thus grounding said outer plates and spacing the plate assembly from said inner wall, said plates corresponding in contour to the vertical cross section of the container, a shell completely enclosing said container to provide an insulated space therebetween, a fitting having a threaded opening therethrough sealed within the walls of said container and shell across said insulated space, a plug adapted to screw into said threaded opening, and a conductor extending through said plug sealed in insulating relation thereto and having its inner end connected to the center conductor plate.

2. The device of claim 1 wherein said inner end of said conductor is soldered to a second insulated conductor, the opposite end of which is connected to said center conductive plate.

References Cited in the file of this patent

UNITED STATES PATENTS

| | | |
|---|---|---|
| 2,409,073 | Sias et al. | Oct. 8, 1946 |
| 2,426,252 | Thomson | Aug. 26, 1947 |
| 2,541,743 | Brockman et al. | Feb. 13, 1951 |
| 2,563,280 | Schafer et al. | Aug. 7, 1951 |

FOREIGN PATENTS

| | | |
|---|---|---|
| 513,771 | Great Britain | Oct. 20, 1939 |